United States Patent
Min

(10) Patent No.: US 8,219,809 B2
(45) Date of Patent: Jul. 10, 2012

(54) METHOD OF OPTIMIZING DATA COMMUNICATION

(75) Inventor: Hoon Min, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 938 days.

(21) Appl. No.: 11/927,267

(22) Filed: Oct. 29, 2007

(65) Prior Publication Data
US 2008/0120502 A1  May 22, 2008

(30) Foreign Application Priority Data

Nov. 17, 2006 (KR) .................. 10-2006-0113678

(51) Int. Cl.
*H04L 9/32* (2006.01)
(52) U.S. Cl. ....................................... 713/168
(58) Field of Classification Search ............ 713/168
See application file for complete search history.

(56) References Cited

U.S. PATENT DOCUMENTS 5,363,448 A * 11/1994 Koopman et al. ............. 713/170
2005/0154917 A1 * 7/2005 deCarmo ..................... 713/201
2005/0177522 A1 * 8/2005 Williams ...................... 705/72
2005/0287991 A1   12/2005 Shima

FOREIGN PATENT DOCUMENTS

CN        1708001 A    12/2005
* cited by examiner

*Primary Examiner* — Jacob Lipman
(74) *Attorney, Agent, or Firm* — Birch, Stewart, Kolasch & Birch, LLP

(57) ABSTRACT

A device and method of optimizing data communication, are discussed. In an embodiment of the method, encrypted authentication is performed to transmit and receive encrypted data to and from a display device after a default delay time has elapsed in a state in which a source device and the display device are connected to each other. If it is determined that the authentication has failed, the encrypted authentication is performed again after an additional delay time or a delay time stored in conjunction with the display device has elapsed. If it is determined that the authentication has succeeded, a required delay time in conjunction with the display device is stored or updated. Thus, the delay time, which is required before the establishment of data communication, can be optimized in consideration of the characteristics of a device connected to perform the data communication.

25 Claims, 2 Drawing Sheets

METHOD OF OPTIMIZING DATA COMMUNICATION

This application claims the priority benefit of Korean Patent Application No. 10-2006-0113678, filed on Nov. 17, 2006, which is hereby incorporated by reference as if fully set forth herein.

BACKGROUND OF THE INVENTION

1. Field of the Invention

The present invention relates generally to a method of optimizing data communication and, more particularly, to a method of reducing the delay time required when a source device and a display device are connected via a high definition multimedia interface.

2. Description of the Related Art

Recently, a High Definition Multimedia Interface (HDMI) or a Digital Visual Interface (DVI) is employed as an uncompressed digital interface that supports a connection between a source device, for example, a set-top box, a Digital Versatile Disc (DVD) player, an Audio/video (A/V) receiver or a computer notebook, for providing digital data, and a display device, for example, a digital TeleVision (TV) or a Personal Computer (PC) monitor.

When such a source device, which is connected with a display device supporting the HDMI, transmits and receives high-quality and high-definition video and audio signals to and from the display device in the form of digital data, High-bandwidth Digital Content Protection (HDCP), which is an encryption standard, can be used to prevent the digital data, which is transmitted and received via the interface, from being duplicated.

In order to successfully perform HDCP authentication with display devices connected via the interface, a delay time necessary to stabilize the display devices before performing the HDCP authentication is set for the source device. In this case, the time periods necessary to stabilize the respective display devices differ from each other, so that the longest delay time is set for the source device which allows the source device to accommodate the worst case.

That is, since one cannot predict which display device will be connected to the source device, the delay time set for the source device is uniformly set to a value for a display device, which requires a long period for system stabilization, so as to accommodate all of the delay times applied by respective manufacturing companies of the display devices. This, however, has a limitation in that a long delay time is needlessly applied even when a display device having a relatively short system stabilization time is connected.

SUMMARY OF THE INVENTION

Accordingly, the present invention has been made keeping in mind the above and other problems and limitations occurring in the related art, and an object of the present invention is to provide a method of optimizing a delay time, which is required before the establishment of data communication, in consideration of the characteristics of a device connected to perform the data communication.

In order to accomplish the above and other objects, the present invention provides according to an embodiment a method of optimizing data communication, including the steps of performing authentication after a default delay time has elapsed in a state in which a first device and a second device are connected to each other; and performing the authentication again after an additional delay time, stored in conjunction with the second device, has elapsed if it is determined that the authentication has failed.

In addition, the present invention provides according to an embodiment a method of optimizing data communication, including the steps of performing authentication after a default delay time has elapsed in a state in which a first device and a second device are connected; and performing the authentication again after an additional delay time has elapsed if it is determined that the authentication has failed; and storing a required delay time in conjunction with the second device if it is determined that the authentication has succeeded.

In addition, the present invention provides according to an embodiment a method of optimizing data communication in a first device for transmitting and receiving encrypted data and a second device for processing received data, including the steps of performing encryption authentication to transmit and receive the encrypted data to and from the second device after a default delay time has elapsed in a state in which the first device and the second device are connected to each other; and performing the encryption authentication again after an additional delay time or a delay time stored in conjunction with the second device has elapsed if it is determined that the authentication has failed, and storing or updating a required delay time in conjunction with the second device if it is determined that the authentication has succeeded.

In addition, the present invention provides according to an embodiment a data communication device, including a communication module connected to a data processing device and configured to transmit and receive data; a memory for storing a default delay time and a delay time associated with the data processing device; and a control unit for encrypting data, which will be transmitted to the data processing device, performing encryption authentication to transmit and receive encrypted data after the default delay time has elapsed in a state in which a connection with the data processing device had been made, performing the authentication again after an additional delay time or a delay time stored in conjunction with the data processing device has elapsed if it is determined that the authentication has failed, and storing or updating a required delay time in conjunction with the data processing device if it is determined that the authentication has succeeded.

Furthermore, the first device and the second device may be connected to each other according to an HDMI or a DVI standard. Furthermore, the data may be encrypted according to an HDCP standard.

Furthermore, Identifier (ID) information for the second device is read before the authentication is performed after the default delay time has elapsed or during the default delay time, and the authentication is performed again after the delay time, stored in conjunction with the read ID information, has elapsed. The ID information may include the manufacturing company and/or model name of a corresponding device.

Furthermore, a data output signal line to the second device data may be muted during the delay time, and the default delay time may be stored in the memory of the first device when the first device is marketed or when the first device is updated. Furthermore, the delay time corresponds to the time period taken to initialize an encryption module or an encryption algorithm, which is used to transmit and receive the encrypted data, in the second device.

Furthermore, the default delay time and the additional delay time that has elapsed before the authentication is performed again are stored as a delay time for the second device, or only the additional delay time that has elapsed before the authentication is performed again, other than the default, is stored as a delay time for the second device. The delay time for the second device may further include a time period taken for the authentication.

According to another embodiment, the present invention provides 8. A method of optimizing data communication, comprising: performing authentication after a default delay time has elapsed in a state in which a first device and a second device are connected; and performing the authentication again after an additional delay time has elapsed, if it is determined that the authentication has failed; and if it is determined that the authentication has succeeded, storing the delay time used in connection with the succeeded authentication, in conjunction with the second device.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
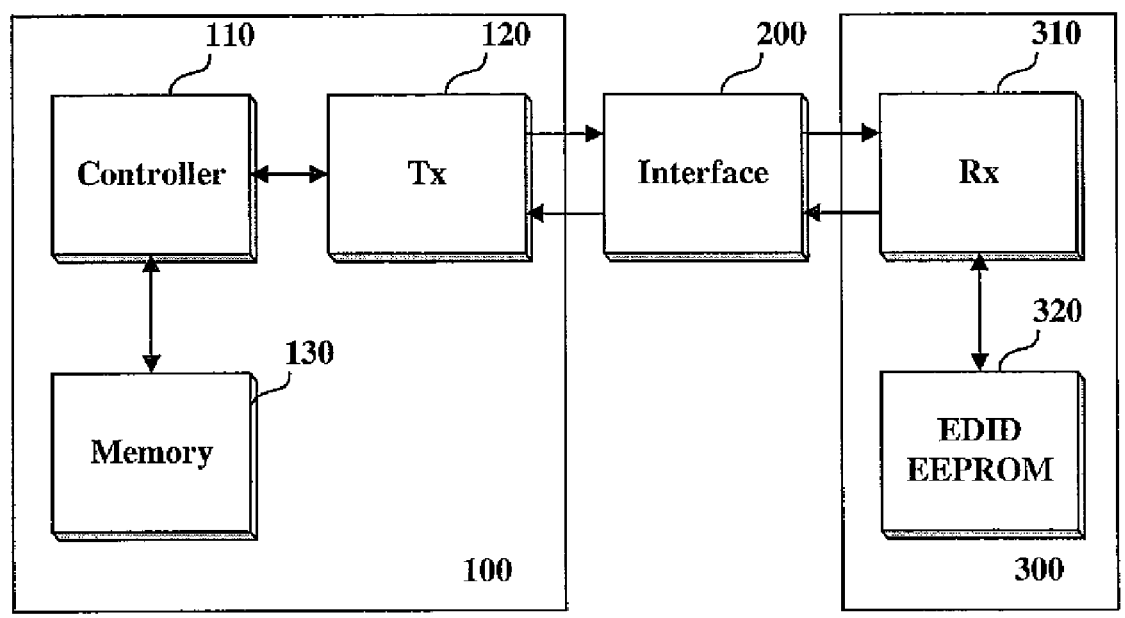
FIG. 1 is a block diagram schematically showing an embodiment of a system to which a method of optimizing data communication according to the present invention is applied.

Preferred embodiments of the present invention are described in detail with reference to the accompanying drawings below.

A source device and a display device, which are connected to each other via the HDMI, transmit and receive encrypted data based on HDCP encryption technology, thus preventing data from being intercepted and illegally duplicated.

The two devices must perform HDCP authentication in order to encrypt data and transmit and receive encrypted data. This may be regarded as a process of mutually identifying ciphers, which will be used when transmitting data to a counterpart. Furthermore, prior to HDCP authentication, each of the two devices must perform HDCP reset, that is, must initialize an HDCP module or an algorithm used to create the ciphers.

After the connection between the two devices is made, the source device, which chiefly transmits data, can check the time period taken for the HDCP reset in the source device is completed, but cannot check the time period taken for the HDCP reset of the connected display device is completed. Accordingly, the source device mutes an output signal line so that signals, which may cause noise or a noisy screen, are not transmitted to the display device during a predetermined delay time (e.g., during the HDCP reset time of the display device) after the connection between the two devices is made.

In the display device, the time period taken until the HDCP reset is completed differs for respective manufacturing companies, respective products, and the types of screen module that are used. The reason for this is because the type, number and order of tasks performed when individual devices are initialized, or booted, differ from each other. A process of initializing the display device may include the initialization of a Liquid Crystal Display, a Plasma Display Panel, a Cathode Ray Tube (CRT), a process of preparing for data communication including HDCP reset, or the like.

The HDCP authentication is a process of exchanging encryption keys that will be used when encrypting and transmitting data. Whether the encryption keys coincide with each other is determined through the transmission and reception of some of the bytes of each encryption key and, thereafter, all of the bytes of each encryption key are transmitted and received. In this case, an attempt to determine whether the encryption keys coincide with each other while transmitting and receiving some of the bytes of each encryption key are transmitted and received may be repeated several times.

The HDCP authentication is not successfully performed in a state in which the counterpart does not perform an HDCP reset, so that a long delay time is set for the source device, and the signals that may cause noise or a noisy screen can also be transmitted to the display device while the failure of the HDCP authentication is repeated. Here, the term 'delay time' is referred to as the latency period taken until the HDCP reset is completed in the counterpart's display device (e.g., the time it takes for the HDCP reset to be completed in the display device)

Accordingly, when a source device, such as a set-top box, a DVD player, an A/V receiver or a computer notebook, is connected with a display device, such as a TV or a monitor, that support an HDMI, the present invention checks the delay time necessary to stably perform the HDCP authentication, stores the delay time, along with ID information, such as the manufacturing company and model name of an HDMI TV, in memory and, then, the previously calculated (stored) delay time is applied when the display device is subsequently connected.

FIG. 1 is a block diagram schematically showing an embodiment of a system to which a method of optimizing data communication according to the present invention is applied.

The system to which the present invention is applied, as shown in FIG. 1, includes a source device 100, such as a set-top box, a DVD player, an A/V receiver, a PC, a computer notebook, etc. for providing digital data; a display device 300, such as a digital TV or a PC monitor, for receiving the digital data from the source device 100 and outputting the digital data to a screen; and an interface 200 for connecting or coupling the devices 100 and 300 so that the digital data can be transmitted therebetween. In this case, as an example only, an HDMI or DVI standard is applied to the interface 200. The interface 200 can include wired and/or wireless parts.

The source device 100 includes a control unit 110 for controlling the overall operation of the source device 100, a transmission unit (Tx) 120 for connecting to the display device 300 and transmitting digital data, which is generated by a digital data generating means (not shown in FIG. 1), for example, a DVD reproduction unit or a tuner, to the display device 300, and a memory or storage unit 130 for storing Extended Display Identification Data (EDID), which is read from the display device 300, in response to a control signal from the control unit 110, and any other data or information.

The display device 300 includes a reception unit (Rx) 310 for receiving the digital data, which is transmitted from the source device 100 connected to the display device 300 via the interface 200, and Electrically Erasable Programmable Read-Only Memory (EEPROM) 320 for storing the EDID, which corresponds to ID information for distinguishing the corresponding device from other devices. The EEPROM 320 is only an example, and other types of storage unit can be used instead. Also the EDID stored in the EEPROM is identification information which identifies the display device 300.

When the display device 300 is connected to the source device 100 via the interface 200, the control unit 110 of the source device 100 checks or determines a system stabilization time that is needed before the source device 100 performs HDCP authentication with the display device 300 (that is, the time period taken to perform and complete the HDCP reset in the display device 300 after the display device 300 has been initialized), and stores this system stabilization time in the memory 130 in conjunction with the ID information of the display device 300. That is, the system stabilization time (e.g., HDCP reset time) of the display device 300 as well as the ID information of the same display device 300 are stored in conjunction with each other in the memory 130 of the source device 100. In this manner, the memory 130 may store the same information for a plurality of different display devices.

Then, when the display device 300 is connected again, the control unit 110 determines whether the ID information of the currently connected display device 300 exists in the memory 130. If it is determined that the ID information of the display device 300 exists in the memory 130, the control unit 110 uses the system stabilization time of the display device 300, which is stored in conjunction with the ID information of the display device 300 in the memory 130, as a system delay time, and performs HDCP authentication with the currently connected display device 300 after this system delay time has elapsed. Accordingly, for each connected display device, the source device 100 allows a specific system delay time that is suitable just for that display device to run, so as to produce an efficient system.

The operation of the system to which the method of optimizing data communication according to an embodiment of the present invention is applied, which is constructed described above, is described in detail in conjunction with FIG. 2 below.

Figure 2:
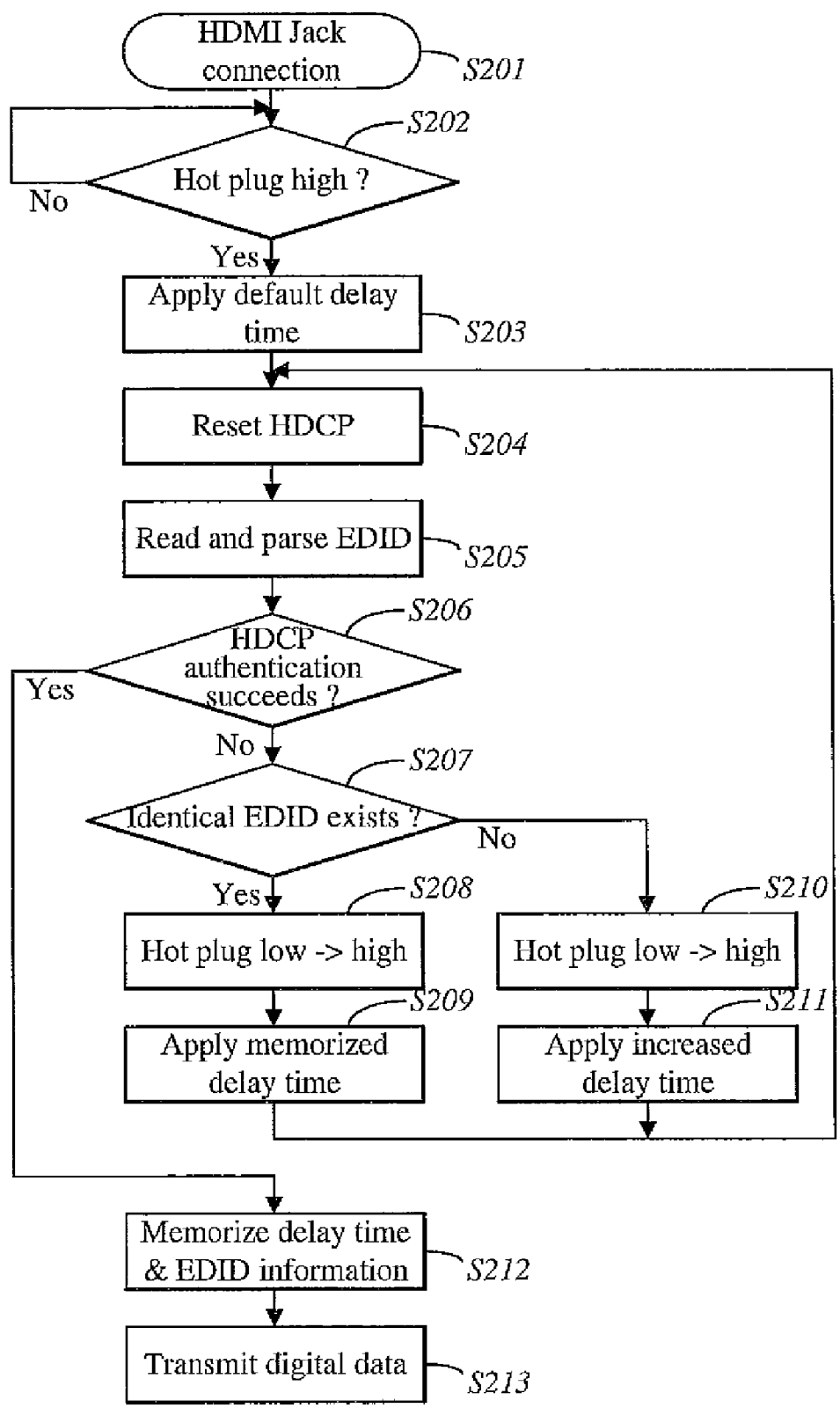
FIG. 2 is a flowchart illustrating the method of optimizing data communication according to an embodiment of the present invention.

FIG. 2 is a flowchart illustrating the method of optimizing data communication according to an embodiment of the present invention. The method of FIG. 2 is implemented in the system of FIG. 1, but can be implemented in other suitable system.

When the display device 300, which receives digital data and outputs the received digital data to a screen, is connected to the source device 100 via the interface 200 at step S201, the control unit 110 of the source device 100, which provides the digital data, determines whether the state of the connection is made stable through the transmission unit 120 at step S202. In this case, whether the state of the connection between the display device 300 and the source device 100 is made stable may be determined based on the signal state of the predetermined pin of a jack connected with the interface 200. For instance, when the state of the connection between the display device 300 and the source device 100 is made stable, the predetermined pin enters a high state. In this case, the stable connection state is called 'hot plug high'. When the hot plug high state is detected, the control unit 110 may set a predetermined register or parameter or flag to a certain value, for example, a value of '1', to indicate that the connection between the display device 300 and the source device 100 is stable.

The control unit 110 sets a default delay time, which is already stored in the memory 130 in advance, to be the delay period taken until an HDCP reset operation is performed at step S203. For instance, the control unit 110 allows the predetermined default delay time so that the HDCP reset operation or other initialization operation in the display device 300 can be performed. Furthermore, the control unit 110 can mute an output signal line so that signals that may cause noise or a noisy screen are not transmitted to the display device 300 by controlling the transmission unit 120 during the delay time.

According to an embodiment, the default delay time is a value obtained through experimentation with a plurality of display devices, and may be determined by considering a user's responses to the delay time and the stabilization time of a display device having high performance, without being set to a value for a display device having low performance such as a display device having a very long initialization time. Furthermore, the default delay time may be stored in the memory 130 when the source device 100 is marketed or when firmware for the source device 100 is updated.

After the default delay time has elapsed (e.g., after the currently connected display device is initialized), the control unit 110 performs an HDCP reset operation to initialize an HDCP module or an algorithm that creates a cipher at step S204, reads EDID information from the EEPROM 320 of the display device 300, which is currently connected via the interface 200, and interprets the read EDID information at step S205. For instance, at step S204, the HDCP reset operation is performed in the source device 100.

The EDID information may include at least one of the manufacturing company, model name, and display parameters and characteristics of a display device, may be recorded in the predetermined address region of the memory of the display device, and may be remotely read by the connected source device at any time at which the power of the display device is turned on. Accordingly, the operation of reading the EDID information at step S205 may be performed at any time after the hot plug high state is entered.

Thereafter, the control unit 110 performs the HDCP authentication operation with the display device 300 by controlling the transmission unit 120, and determines whether the HDCP authentication has succeeded at step S206. In this case, some of the bytes of each encryption key, which are used to encrypt data to be transmitted, are first transmitted and received, and thus an attempt to determine whether the authentication has succeeded may be repeated a predetermined number of times based on such process.

If it is determined at step S206 that the HDCP authentication has succeeded, the control unit 110 stores the EDID information (e.g., the manufacturing company and/or model name of the display device, etc.) that was obtained at step S205 into the memory 130 in conjunction with the default delay time, at step S212. The control unit 110 also encrypts the data using HDCP encryption technology and transmits the encrypted data to the display device 300 at step S213.

Meanwhile, if it is determined at step S206 that the HDCP authentication has failed, the control unit 110 determines whether information coinciding with the EDID information read at step S205 exists in the memory 130, at step S207. If it is determined at step S207 that the information coinciding with the read EDID information does not exist in the memory 130 (e.g., the currently connected display device has not been registered in the memory 130), the control unit 110 changes the hot plug state from a low to a high level (e.g., it changes the value of the register, which is set to a value of '1,' to a value of '0') in order to formally indicate that a stable connection state has been achieved again, and then sets the value of the register to a value of '1' again at step S210.

The control unit 110 sets the delay time to an increased delay time and applies the increased delay time at step S211, and performs steps S204 to 206 again after the increased delay time has elapsed. For instance, if it is determined that the currently connected display device may need a longer time to perform HDCP reset, the control unit 110 increases the delay time to be longer than the default delay time and applies the increased delay time for the next HDCP authentication attempt. As described above, the control unit 110 can mute the output signal line during the delay time by controlling the transmission unit 120.

In contrast, if it is determined at step S207 that the information coinciding with the EDID information read at step S205 exists in the memory 130, the control unit 110 changes the hot plug state to high->low->high at step S208, and applies the delay time stored in the memory 130 in conjunction with the EDID information of the current display device at step S209, and performs steps S204 to S206 again after this delay time has elapsed. For instance, the delay time specifically designated for the currently connected display device is obtained from the memory 130 and is used for the next HDCP authentication attempt.

Furthermore, if it is determined that the HDCP authentication has failed again at step S206, the control unit 110 can perform only step S209 or S211 of applying the new delay time without performing steps S208 and S210 of initializing a hot plug state and step S204 of performing an HDCP reset operation, and thus may perform the HDCP authentication (step S207) again immediately after the corresponding delay time has elapsed.

Thereafter, if it is determined that the HDCP authentication has succeeded, the control unit 110 newly stores the EDID information and the last applied delay time in the memory 130 in conjunction with each other, or updates the existing delay time at step S212. That is, for any connected display device, its EDID information and the delay time used to obtain a successful HDCP authentication are stored and updated in the memory 130 for subsequent connection.

In the case where the HDCP authentication succeeds after step S206 has been performed two times or more, the sum of the initial default delay time and the subsequently applied delay time, or only the subsequently applied delay time, but not the default delay time, may be stored as the delay time for the corresponding EDID information. Furthermore, the time period taken to perform the HDCP authentication may be further added. In this case, the time period taken to perform the last HDCP authentication may be excluded.

Although the HDCP reset operation of step 204 has been described as being performed after the delay time has elapsed, the HDCP reset operation of step S204 and the EDID read operation of step S205, but not the HDCP authentication of S206, may be performed during the delay time, and the HDCP authentication of step S206 may be performed after the delay time has elapsed.

As described above, the default delay time, applied before the HDCP authentication is performed, can be set to a short delay time in conformity with the time period taken until a display device having a short stabilization time, that is, a short booting or initialization time period, is initialized. Accordingly, in a display device having high performance, the time period for preparing for data communication can be reduced. Furthermore, a sufficient standby time is provided for a display device having low performance, and thus the HDCP authentication can be stably performed.

Accordingly, the delay time required before the establishment of communication can be optimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of optimizing data communication, comprising:
   performing authentication after a default delay time has elapsed in a state in which a first device and a second device are connected to each other; and
   performing the authentication again after an additional delay time stored in conjunction with the second device has elapsed, if it is determined that the authentication has failed,
   wherein the additional delay time is longer than the default delay time and the additional delay time corresponds to a latency period taken for a High-bandwidth Digital Content Protection (HDCP) authentication reset to be completed in the second device after the second device is connected with the first device.

2. The method as set forth in claim 1, wherein the first device and the second device are connected to each other according to a High Definition Multimedia Interface (HDMI) or a Digital Visual Interface (DVI) standard.

3. The method as set forth in claim 1, wherein a data output signal line to the second device is muted during the default delay time and/or the additional delay time.

4. The method as set forth in claim 1, wherein the default delay time is stored in a memory of the first device when the first device is marketed or when the first device is updated.

5. The method as set forth in claim 1, wherein the first device encrypts data and transmits the encrypted data to the second device.

6. The method as set forth in claim 5, wherein the second device receives the encrypted data from the first device and processes the received data.

7. The method as set forth in claim 5, wherein the first device encrypts the data according to a High-bandwidth Digital Content Protection (HDCP) standard.

8. A method of optimizing data communication, comprising:
   performing authentication after a default delay time has elapsed in a state in which a first device and a second device are connected; and
   performing the authentication again after an additional delay time has elapsed, if it is determined that the authentication has failed, wherein the additional delay time is longer than the default delay time and the additional delay time corresponds to a latency period taken for a High-bandwidth Digital Content Protection (HDCP) authentication reset to be completed in the second device after the second device is connected with the first device; and
   if it is determined that the authentication has succeeded, storing the default delay time or the additional delay time used in connection with the succeeded authentication, in conjunction with the second device.

9. The method as set forth in claim 8, wherein the first device encrypts data and transmits the encrypted data to the second device, and
   the second device receives the encrypted data from the first device and processes the received data.

10. The method as set forth in claim 8, wherein the first device and the second device are connected to each other according to a High Definition Multimedia Interface (HDMI) or a Digital Visual Interface (DVI) standard.

11. The method as set forth in claim 8, wherein the default delay time and the additional delay time that has elapsed before the authentication is performed again are stored as a delay time for the second device, or only the additional delay time that has elapsed before the authentication is performed again, but not the default delay time, is stored as a delay time for the second device.

12. The method as set forth in claim 11, wherein the delay time for the second device further comprises a time period taken for the authentication.

13. A method of optimizing data communication between a first device for transmitting and receiving encrypted data and a second device for processing received data, the method comprising:
 performing encryption authentication to transmit and receive the encrypted data to and from the second device after a default delay time has elapsed in a state in which the first device and the second device are connected to each other;
 performing the encryption authentication again after an additional delay time or a delay time stored in conjunction with the second device has elapsed, if it is determined that the authentication has failed, wherein the additional delay time or the delay time is longer than the default delay time and the additional delay time corresponds to a latency period taken for a High-bandwidth Digital Content Protection (HDCP) encryption authentication reset to be completed in the second device after the second device is connected with the first device; and
 storing or updating a required delay time in conjunction with the second device, if it is determined that the authentication has succeeded.

14. The method as set forth in claim 13, wherein the delay time corresponds to a time period taken to initialize an encryption module or an encryption algorithm in the second device.

15. The method as set forth in claim 13, wherein identifier (ID) information for the second device is read before the authentication is performed after the default delay time has elapsed or during the default delay time, and
 the authentication is performed again after the delay time, stored in conjunction with the read ID information, has elapsed.

16. The method as set forth in claim 15, wherein the ID information comprises a manufacturing company and/or model name of the second device.

17. A data communication device, comprising:
 a communication module connected to a data processing device and configured to transmit and receive data;
 a memory configured to store a default delay time and a delay time associated with the data processing device; and
 a control unit configured to encrypt data to be transmitted to the data processing device, to perform encryption authentication to transmit and receive encrypted data after the default delay time has elapsed in a state in which a connection with the data processing device had been made, to perform the authentication again after an additional delay time or a delay time stored in conjunction with the data processing device has elapsed if it is determined that the authentication has failed, wherein the additional delay time or the delay time is longer than the default delay time and the additional delay time or the delay time corresponds to a latency period taken for a High-bandwidth Digital Content Protection (HDCP) encryption authentication reset to be completed in the data processing device after the data processing device is connected with the communication module, and to store or updating a required delay time in conjunction with the data processing device if it is determined that the authentication has succeeded.

18. The data communication device as set forth in claim 17, wherein the data processing device is connected according to a High Definition Multimedia Interface (HDMI) or a Digital Visual Interface (DVI) standard, and the control unit encrypts the data according to a High-bandwidth Digital Content Protection (HDCP) standard.

19. The data communication device as set forth in claim 17, wherein the control unit mutes a data output line to the data processing device during the delay time by controlling the communication module.

20. The data communication device as set forth in claim 17, wherein the default delay time is stored in the memory when the data communication device is marketed or when the data communication device is updated.

21. The data communication device as set forth in claim 17, wherein the delay time corresponds to a time period taken to initialize an encryption module or an encryption algorithm in the data processing device.

22. The data communication device as set forth in claim 17, wherein the control unit reads ID information for the data processing device before the authentication is performed after the default delay time has elapsed or during the default delay time, and performs the authentication again after a delay time stored in conjunction with the read ID information has elapsed.

23. The data communication device as set forth in claim 22, wherein the ID information comprises a manufacturing company and/or model name of the data processing device.

24. The data communication device as set forth in claim 17, wherein the default delay time and the additional delay time that has elapsed before the authentication is performed again are stored as a delay time for the data processing device, or only the additional delay time that has elapsed before the authentication is performed again, but not the default delay time, is stored as a delay time for the data processing device.

25. The data communication device as set forth in claim 24, wherein the delay time for the data processing device further comprises a time period taken for the authentication.

* * * * *